US012250534B2

(12) United States Patent
Scheuregger et al.

(10) Patent No.: US 12,250,534 B2
(45) Date of Patent: Mar. 11, 2025

(54) ADAPTIVE SOUND SCENE ROTATION

(71) Applicant: Bang & Olufsen, A/S, Struer (DK)

(72) Inventors: Oliver Scheuregger, Valby (DK); Lyle Bruce Clarke, Lunderskov (DK); Neo Kaplanis, Wewyn Garden City (GB)

(73) Assignee: Bang & Olufsen A/S, Struer (DK)

( * ) Notice: Subject to any disclaimer, the term of this patent is extended or adjusted under 35 U.S.C. 154(b) by 242 days.

(21) Appl. No.: 18/054,644

(22) Filed: Nov. 11, 2022

(65) Prior Publication Data
US 2024/0163629 A1 May 16, 2024

(51) Int. Cl.
*H04R 5/02* (2006.01)
*G06F 3/01* (2006.01)
*H04S 7/00* (2006.01)

(52) U.S. Cl.
CPC .............. *H04S 7/303* (2013.01); *G06F 3/011* (2013.01); *G06F 3/017* (2013.01); *H04S 2420/01* (2013.01)

(58) Field of Classification Search
CPC ...... H04S 7/303; H04S 2420/01; G06F 3/011; G06F 3/017
USPC .................................................. 381/300, 303
See application file for complete search history.

(56) References Cited

U.S. PATENT DOCUMENTS

| | | | |
|---|---|---|---|
| 6,144,747 A | 11/2000 | Scofield et al. | |
| 10,251,012 B2 | 4/2019 | Schaefer | |
| 2018/0359596 A1 | 12/2018 | Breebaart et al. | |
| 2021/0168508 A1* | 6/2021 | Walther | H04R 3/12 |

FOREIGN PATENT DOCUMENTS

EP 3985482 A1 * 4/2022 ............ G06F 3/012

OTHER PUBLICATIONS

"10 Things you need to know about Next Generation Audio," EBU Operating Eurovision and Euroradio, Date Accessed: Feb. 10, 2023, pp. 1-30.
Peter, "What is . . . Higher Order Ambisonics?" SSA Plugins, Dated: Jul. 18, 2017, pp. 1-7.
European Office Action dated Mar. 12, 2024 for Application No. 23208272.7.
European Patent Office, Extended European Search Report for European Patent Application No. 23208272.7, dated Jun. 28, 2024.

* cited by examiner

*Primary Examiner* — Ammar T Hamid
(74) *Attorney, Agent, or Firm* — Patterson + Sheridan, LLP

(57) ABSTRACT

The disclosure provides an approach for adaptive sound scene rotation. A method of adaptively rendering audio is provided. The method includes obtaining an audio signal. The audio signal is associated with one or more audio channels and each audio channel is associated with a position of an audio source with respect to a reference point within a local reproduction system. The method includes determining a rotation of a user with respect to a reference orientation about the reference position within the local reproduction system and determining a system rotation based on the rotation of the user. The method includes rendering the audio signal to one or more loudspeakers of a plurality of loudspeakers within the local reproduction system, based on the system rotation, a number of the plurality of loudspeakers, and the plurality of positions of the plurality of loudspeakers, to compensate for the rotation of the user.

19 Claims, 10 Drawing Sheets

ADAPTIVE SOUND SCENE ROTATION

FIELD OF THE DISCLOSURE

The present disclosure is related to sound reproduction systems and, more specifically, to reproduction and control of sound fields with adaptive sound scene rotation.

BACKGROUND

Stereophonic sound, more commonly known as "stereo", is a method of sound reproduction that uses at least two independent audio channels, through a configuration of at least two loudspeakers (or alternatively, a pair of two-channel headphones), to create a multi-directional and three-dimensional audio perspective that provides an audio experience to the listener that creates the impression of sound heard from various directions, as in natural hearing.

Surround sound refers to stereo systems using more than two audio channels, more than two loudspeakers, or both, to enrich the depth and fidelity of the sound reproduction. Stereo sound can be captured as live sound (e.g., using an array of microphones), with natural reverberations present, and then reproduced over multiple loudspeakers to recreate, as close as possible, the live sound. Pan stereo refers to a single-channel (mono) sound that is then reproduced over multiple loudspeakers. By varying the relative amplitude of the signal sent to each speaker, an artificial direction (relative to the listener) can be created.

One type of stereo audio is referred to as mid/side (M/S). A bidirectional microphone (e.g., with a figure eight pattern) facing sideways and a cardioid facing the sound source can be used to record mid/side audio. The "left" and "right" audio channels are encoded through a simple matrix: Left=Mid+Side and Right=Mid−Side, where "minus" means adding the side signal with the polarity reversed. The stereo width, and thereby the perceived distance of the sound source, can be manipulated after the recording.

Panning algorithms are capable of redistributing audio signals across a given array of transducers. Panning algorithms are used in both the creation of audio content (e.g., a studio mixing desk will typically have stereo pan-pots to position an audio signal across the left-right dimension), as well as in the rendering of audio (e.g., in consumer loudspeaker setups). Examples of panning algorithms include, but are not limited to, Vector Base Amplitude Panning (VBAP), Ambisonic panning (e.g., Ambisonic Equivalent Panning (AEP)), Distance Base Angular Panning (DBAP), Layer Base Amplitude Panning (LBAP), Dual Band Vector Base Panning (VBP Dual-Band), K-Nearest Neighbor (KNN) panning, Speaker-Placement Correction Amplitude (SPCAP) panning, Continuous Surround Panning (CSP), and Angular and PanR panning.

In today's media-driven society, there are increasingly more ways for users to access video and audio, with a plethora of products producing sound in the home, car, or almost any other environment. Portable products producing audio, such as, for example, phones, tablets, laptops, headphones, portable loudspeakers, soundbars, and many other devices, are ubiquitous. These products for producing sounds may include, for example, a large variety of audio such as music, speech, podcasts, sound effects, and audio associated with video content.

Next Generation Audio (NGA) refers to developments in technologies that strive to create audio systems which are immersive, providing a user an enhanced immersive auditory experience; adaptive, capable of adapting to different acoustic environments, different listener/speaker locations, and different listening contexts; and interactive, allowing users to make conscious decisions to interact with the system such that the auditory experience is modified in a way that is intuitive and expected by the user. NGA technologies include, for example, rendering technologies, focused on digital processing of audio signals to improve the acoustic experience of the listener; user interaction technologies, focused on mapping user-driven actions to changes in the auditory experience; and experiential technologies, focused on using technology to deliver new auditory experiences.

One NGA technology is Object-Based Audio, which consists of audio content together with metadata that tells the receiver device how to handle the audio. For example, in a traditional audio production process, many audio sources (e.g., microphones) are used to capture sound, and the audio sources can then be mixed down to a fewer number of channels which represent the final speaker layout, referred to as "downmixing". For example, a hundred (100) microphones may be used to capture the sound played by an orchestra and then mixed down to two audio channels—one for "left" and one for "right" to be reproduced by two loudspeakers in a stereo system. With Object-Based Audio, the sound sources can be grouped, or isolated, into audio feeds that constitute separate, logical audio objects. For example, the different audio feeds might correspond to different individual voices or instruments, different sound effects (e.g., like a passing vehicle). An audio feed for a group of microphones can make up a logical entity (e.g., a string section or a drum kit). Each feed is distributed as a separate object made of the audio and the metadata containing descriptive data describing the audio, such as the audio's spatial position, the audio level, and the like. The metadata can be modified by a user, allowing the user to control how that audio stream is reproduced.

Another example of NGA technology is Immersive Audio, which augments horizontal surround sound with the vertical dimension (i.e., height). Immersive audio formats may be encoded as either channel-based systems or sound-scene-based systems. In the case of channel-based systems, a number of audio channels contain the audio signals, where each channel is assigned to a discrete physical loudspeaker in the reproduction setup. This is identical to how "non-immersive" channel-based audio formats (e.g., stereo, 5.1) are represented, the only difference being the number of channels available and the number of physical loudspeakers able to reproduce the sound field. Examples include 22.2 and 10.2 systems, as described in the ITU-R BS.2159-9.

Soundscene-based audio formats encode an acoustic sound field which can later be decoded to a specified loudspeaker array and/or headphone format. One soundscene-based method is Ambisonics, which encodes a sound field above and below the listener in addition to in the horizontal plane (e.g., front, back, left, and right). Ambisonics can be understood as a three-dimensional extension of mid/side stereo that adds additional channels for height and depth. Ambisonics is a technique storing and reproducing a sound field at a particular point with spatial accuracy. The degree of accuracy to which the sound field can be reproduced depends on multiple factors, such as the number of loudspeakers available at the reproduction stage, how much storage space is available, computing power, download/transmission limits, etc. Ambisonics involves encoding a sound field to create a set of signals, referred to as audio channels, that depends on the position of the sound, with the audio channels weighted (e.g., with different gains) depending on the position of the sound source. A decoder then decodes the audio channels to reproduce the sound field. Loudspeaker signals can be derived using a linear combination of the Ambisonic component signals.

As discussed in more detail herein, when consuming audio-visual content, a user may reorient themselves to face in any direction at any given moment. In some scenarios, when the user reorients, the direction of the visual content changes relative to the audio. This causes a mismatch between visual and audio orientation, relative to the listener, which may degrade the user's experience.

Accordingly, techniques for improving the user experience of a mobile user consuming audio-visual content are needed.

SUMMARY

The technology described herein provides a method of adaptive sound scene rotation.

A method of adaptively rendering audio in a local reproduction system including a plurality of loudspeakers at a plurality of positions is provided. The method includes obtaining an audio signal. The audio signal is associated with one or more audio channels. Each audio channel is associated with a position of an audio source with respect to a reference point within the local reproduction system. The method includes determining a rotation of a user with respect to a reference orientation about the reference position within the local reproduction system. The method includes determining a system rotation based on the rotation of the user. The method includes rendering the audio signal to one or more loudspeakers of the plurality of loudspeakers, based on the system rotation, a number of the plurality of loudspeakers, and the plurality of positions of the plurality of loudspeakers, to compensate for the rotation of the user.

Other aspects provide: an apparatus operable, configured, or otherwise adapted to perform any one or more of the aforementioned methods and/or those described elsewhere herein; a non-transitory, computer-readable media comprising instructions that, when executed by a processor of an apparatus, cause the apparatus to perform the aforementioned methods as well as those described elsewhere herein; a computer program product embodied on a computer-readable storage medium comprising code for performing the aforementioned methods as well as those described elsewhere herein; and/or an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF THE DRAWINGS

The appended figures depict certain features of the various aspects described herein and are not to be considered limiting of the scope of this disclosure.

DETAILED DESCRIPTION

Figure 1:
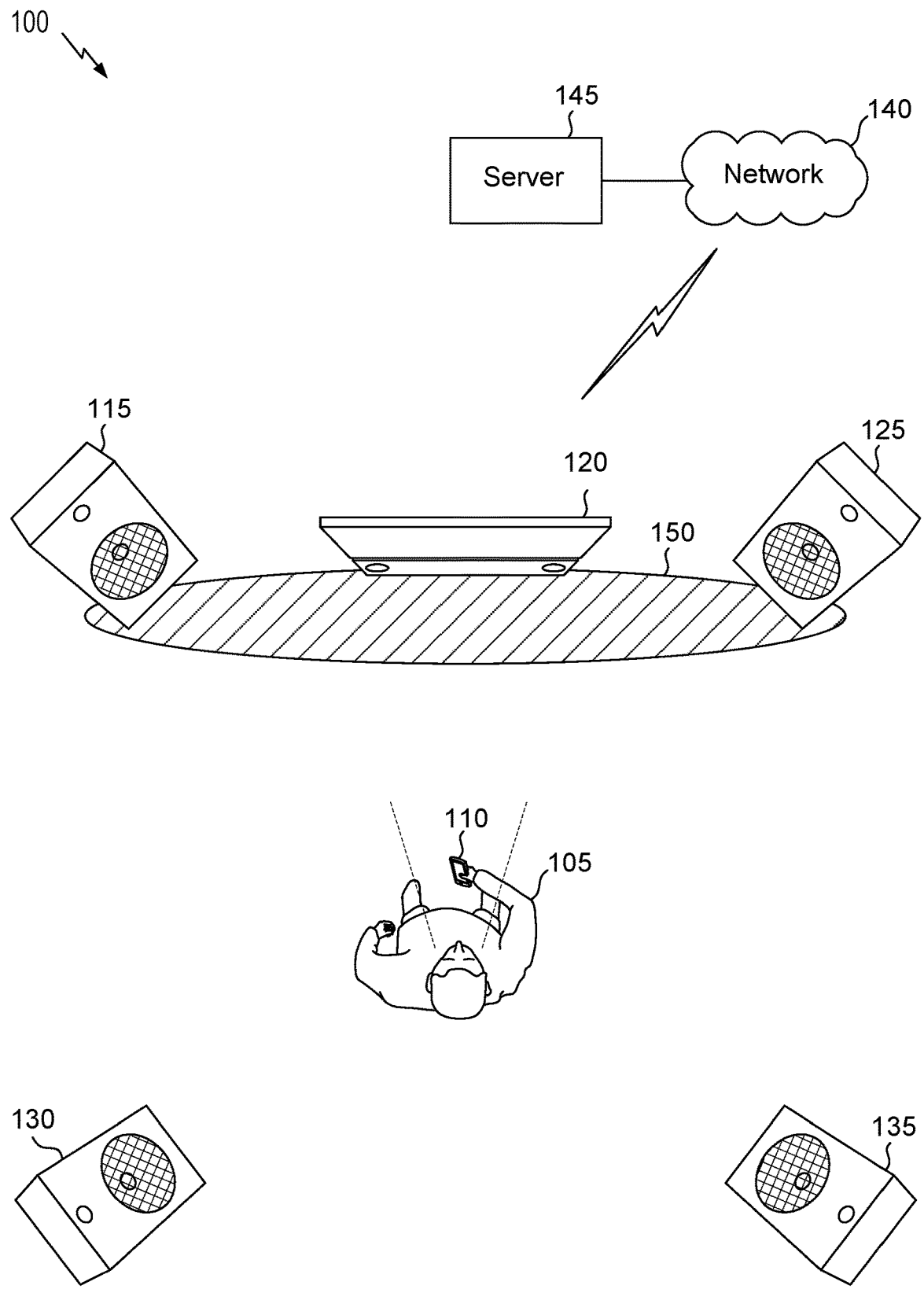
FIG. 1 depicts a diagram of an example multimedia system and sound field, according to one or more aspects.

The present disclosure provides an approach for adaptive sound scene rotation. The adaptive sound scene rotation can adapt to user rotation in a system in which the user consumes tethered video content and untethered audio content. The system can adaptively and dynamically rotate the sound scene such that the sound field generated by the local reproduction system allows the user to experience the audio content as though the audio content is tethered to the user providing a consistent and enjoyable audio and visual experience even as the user moves about the room.

In some aspects, rotation data associated with a user's orientation (e.g., rotation) relative to a reference user orientation is collected. The rotation data can be used to estimate the user's orientation. In some aspects, a time constant is applied to the raw rotation data to smooth the rotation data before estimating the user's rotation.

In some aspects, a system rotation value is determined from the user's rotation. The system rotation can be applied to one or more input audio channels before panning, to rotate positional information associated with the one or more input audio channels. The system rotation can be applied during the panning, such as to rotate one or more coefficients of the panning algorithm. The system rotation can be applied to rotate the output audio channels of the panning algorithm before rendering the rotated audio channels to a local reproduction system. The system rotation can be applied to local reproduction setup information to rotate a reference point or to rotate loudspeaker positions. In some aspects, a second panning algorithm is used to rotate the audio channels before or after the first panning algorithm.

In some aspects, the input audio channels are upmixed or downmixed before applying the system rotation and before the panning. In some aspects, the input audio channels are upmixed or downmixed after applying the system rotation and after the panning.

Example System with Adaptive Sound Scene Rotation

Aspects of the disclosure for adaptive sound scene rotation may be performed when a user is consuming audio-visual content. An audio-visual multimedia system includes a visual display and acoustic transducers. Both audio systems and visual systems have the option to be tethered, or untethered, to the user. As used herein, "tethered" refers to whether the audio-visual content moves with the user when the user moves. For example, headphones worn by a user which do not apply dynamic head-tracking processing provide a "tethered" audio system, where the audio does not change relative to the user. As the user moves about, the user continues to experience the audio in the same way. On the other hand, loudspeakers placed in a room are "untethered" and do not move with the user. Similarly, a pair of headphones which employ dynamic head-tracked binaural rendering would be considered a form of "untethered", albeit one that is simulated. Thus, as the user moves about, the user may experience the audio content differently. Similarly, a television mounted to a wall is an example of an untethered visual system, whereas a screen (e.g., a tablet or phone) held by the user is an example of a tethered visual system. A virtual reality (VR) headset may provide a form of simulated "untethered" video content, in which the user experiences the video content differently as the user moves about. It should be understood that these examples are merely illustrative, and other devices may provide tethered and untethered audio and visual content to a user.

Multimedia installations typically include a display screen, loudspeakers, a control unit for providing input to the display screen and to the loudspeakers. The input may be a signal from a television provider, a radio provider, a gaming console, various Internet streaming platforms and the like. It should be understood that other components may also be comprised in a multimedia installation.

FIG. 1 depicts example multimedia system 100 in which aspects of the present disclosure may be implemented. Multimedia system 100 may be located in any environment, such as a home, such as in a living room, home theater, yard, or other room, in a vehicle, in an indoor or outdoor venue, or any other suitable location.

As shown, multimedia system 100 may include loudspeakers 115, 120, 125, 130, and 135. Loudspeakers 115, 120, 125, 130, and 135 may be any electroacoustic transducer device capable of converting an electrical audio signal into a corresponding sound. Loudspeakers 115, 120, 125, 130, and 135 may include one or more speaker drivers, subwoofer drivers, woofer drivers, mid-range drivers, tweeter drivers, coaxial drivers, and amplifiers which may be mounted in a speaker enclosure. Loudspeakers 115, 120, 125, 130, and 135 may be wired or wireless. Loudspeakers 115, 120, 125, 130, and 135 may be installed in fixed positions or moveable. Loudspeakers 115, 120, 125, 130, and 135 may be any type of speakers, such as surround-sound speakers, satellite speakers, tower or floor-standing speakers, bookshelf speakers, sound bars, TV speakers, in-wall speakers, smart speakers, portable speakers. It should be understood that while five loudspeakers are shown in FIG. 1, multimedia system 100 may include fewer or greater number of loudspeakers which may be positioned in multiple different configurations, as discussed in more detail below with respect to FIG. 2.

Multimedia system 100 may include one or more video displays. For example, a video display may be a tablet 110 as shown in FIG. 1. It should be understood that a video display may be any type of video display device, such as a TV, a computer monitor, a smart phone, a laptop, a projector, a VR headset, or other video display device.

Although not shown in FIG. 1, multimedia system 100 may include an input controller. The input controller may be configured to receive an audio/visual signal and provide the visual content to a display (e.g., tablet 110) and audio content to the loudspeakers 115, 120, 125, 130, and 135. In some systems, separate input controllers may be used for the visual and for the audio. In some systems, the input controller may be integrated in one or more of the loudspeakers 115, 120, 125, 130, and 135 or integrated in the display device. In some systems, the input controller may be a separate device, such as a set top box (e.g., an audio/video receiver device).

In some aspects, one or more components of the multimedia system 100 may have wired or wireless connections between them. Wireless connections between components of the multimedia system 100 may be provided via a short-range wireless communication technology, such as Bluetooth, WiFi, ZigBee, ultra wideband (UWB), or infrared. Wired connections between components of the multimedia system 100 may be via auxiliary audio cable, universal serial bus (USB), high-definition multimedia interface (HDMI), video graphics array (VGA), or any other suitable wired connection.

In addition, multimedia system 100 may have a wired or wireless connection to an outside network 140, such as a wide area network (WAN). Multimedia system 100 may connect to the Internet via an Ethernet cable, WiFi, cellular, broadband, or other connection to a network. In some aspects, network 140 further connects to a server 145. In some aspects, the input controller may be integrated in the server 145.

A user 105 may interact with the multimedia system 100. For example, the user 105 may consume audio/visual content output by the multimedia system 100. In the example shown in FIG. 1, the user 105 may listen to sound from the loudspeakers 115, 120, 125, 130, and 135 and may view video on the tablet 110. In some aspects, the user 105 may also control the multimedia system 100. For example, the user 105 may position loudspeaker 115, 120, 125, 130, and 135 and/or the video display(s) within the multimedia system 100, and the user 105 may configure one or more settings of the multimedia system 100.

The number of loudspeakers (e.g., five, in the example illustrated in FIG. 1) and positions of loudspeakers within the multimedia system 100 may be referred to herein as a local reproduction setup. The sound output by the local reproduction setup create what is referred to herein as a sound field 150 or sound image. The sound field 150 refers to the perceived spatial locations of the sound source(s), which may be laterally, vertically, and depth. A surround sound system that provides a good user experience offers good imaging all around the listener. The quality of the sound field arriving at the listener's ear may depend on both the original recording and the local reproduction setup.

Recommended loudspeaker positions are provided by the International Telecommunication Union (ITU) Radiocommunication Sector (ITU-R). For example, ITU-R BS.775-3 provides recommendations for Multichannel stereophonic sound system with and without accompanying picture. In some aspects, a multimedia system 100 may be configured according to the ITU-R recommendations. In some aspects, a multimedia system 100 may not be configured according to the standard ITU-R recommendations, but may be configured at any positions desired by the user (e.g., due to area constraints within a room or environment).

Figure 2:
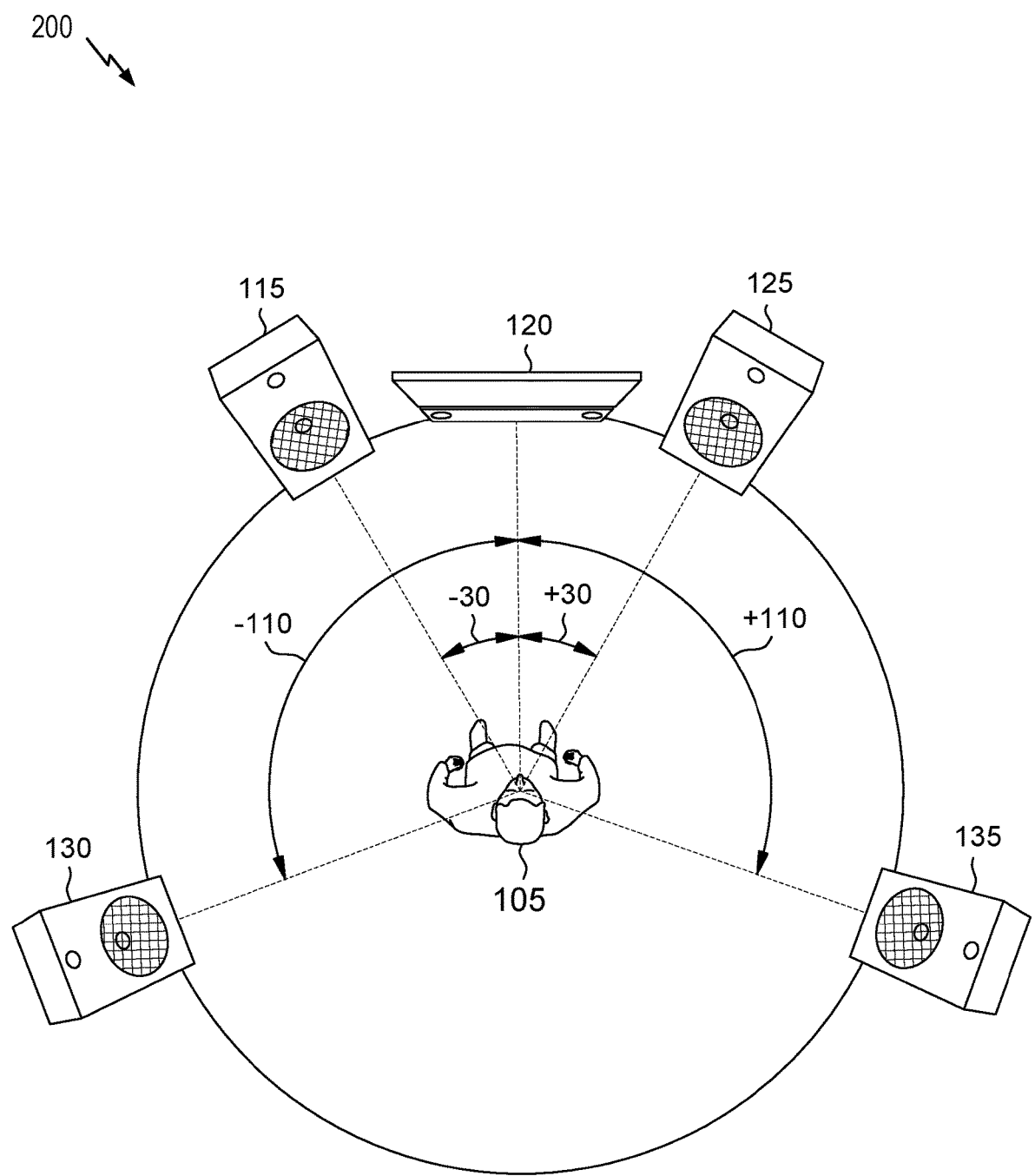
FIG. 2 depicts an example local reproduction setup in the multimedia system of FIG. 1, according to one or more aspects.

FIG. 2 depicts an example local reproduction setup 200 in the multimedia system 100 of FIG. 1, according to one or more aspects. FIG. 2 illustrates local reproduction setup 200 with the five loudspeakers 115, 120, 125, 130, and 135 of example multimedia system 100, however, as discussed herein, different numbers of loudspeakers may be included in the multimedia system with different arrangements.

As shown, the example local reproduction setup 200 includes three front loudspeakers, 115, 120, and 125, combined with two rear/side loudspeakers 130 and 135. Optionally, there may be an even number of more than two rear-side loudspeakers which may provide a larger listening area and greater envelopment for the user. For example, a seven loudspeaker setup may provide two additional side loudspeakers in addition to the left-rear loudspeaker 130 and the right-rear loudspeaker 135.

In some aspects, center loudspeaker 120 may be integrated in a TV (e.g., a high-definition TV (HDTV)) or a soundbar positioned in front of or below the TV. The left-front loudspeaker 115 and the right-front loudspeaker 125 are placed at extremities of an arc subtending 60° at the reference listening point. As shown in FIG. 2, the left-front loudspeaker 115 is positioned at −30°, where 0° is defined here as the line from the user 105 to the center loudspeaker 120, and where the minus angle is defined in the left, or counter-clockwise, direction from the center line. As shown in FIG. 2, the right-front loudspeaker 125 is positioned at +30° from the center line, and where the positive angle is defined in the right, or clockwise, direction from the center line. The distance between the left-front loudspeaker 115 and the right-front loudspeaker 125 is referred to as the loudspeaker basewidth (B). Where the center loudspeaker 120 is integrated in a screen, the distance between the reference listening point (e.g., user 105) and the screen is referred to as the reference distance and may depend on the height (H) and width (β) of the screen. In some aspects, the center and front loudspeakers, 115, 120, and 125 may be positioned at a height approximately equal to a sitting user (e.g., 1.2 meters).

As shown in FIG. 2, the left-rear loudspeaker 130 is positioned between −100° and −120°, e.g., at −110° as shown, and the right-rear loudspeaker 135 is positioned at between +100° and +120°, e.g., +110° from the center line. In some aspects, the side/rear loudspeakers 130 and 135 may be positioned at a height equal or higher than the front loudspeakers and may have an inclination pointing downward. The side/rear loudspeakers 130 and 135 may be positioned no closer to the reference point than the front/center loudspeakers 115, 120, and 125.

In some aspects, for the example local reproduction setup 200, five audio channels may be used for front left (L), front right (R), centre (C), left side/rear (LS), and right side/rear (RS). Additionally, a low frequency effects (LFE) channel may be included. The LFE channels may carry high level (e.g., loud), low frequency sound effects, this channel is indicated by the "0.1" in a "5.1" surround sound format.

Down-mixing (also referred to as downward mixing or downward conversion) or up-mixing (also referred to as upward conversion or upward mixing) can be performed to reduce or increase the number of channels to a desired number based on the number of delivered signals/channels and the number of available reproduction devices. Down-mixing involves mixing a higher number of signals/channels to a lower format with fewer channels, for example, for a local reproduction setup that does not have enough available loudspeakers to support the higher number of signals/channels. Up-mixing may be used when the local reproduction setup has a greater number of available loudspeakers supporting a higher number of signals/channels than the input number of signals/channels. Up-mixing involves generation of the "missing" channels. ITU-R provides example down-mixing equations and example up-mixing equations.

As mentioned above, while local reproduction setup 200 and multimedia system 100 depict five loudspeakers in an example arrangement, a local reproduction setup may include different numbers of loudspeakers in different arrangements. For example, ITU-R provides recommendations for multimedia systems with three, four, five, and seven loudspeakers for mono-channel systems, mono plus mono surround channel systems, two-channel stereo systems, two-channel stereo plus one surround channel systems, three-channel stereo systems, three-channel stereo plus one surround channels systems, and three-channel stereo plus two surround channels systems. Furthermore, as mentioned above, it should be understood that the local reproduction setup of a multimedia system may be configured in a non-standardized loudspeaker arrangements (e.g., configured with any arbitrary arrangement of two or more loudspeakers). In this case, information about the local reproduction setup (e.g., such as, number of loudspeakers, positions of loudspeakers relative to a reference point, etc.) is provided to the system.

With channel-based audio, the channels can be mixed according to pre-established speaker layout (e.g., stereo, 5.1 surround, or any of the other systems discussed above) and are then distributed (e.g., streamed, stored in a file or DVD, etc.). In a studio, the recorded sounds pass through a panner that controls how much sound should be placed on each output channel. For example, for a 5.1 surround mix and a sound located somewhere between center and right, the panner will place a portion of the signal on the center and right channels, but not on the remaining channels. The output of the panners are mixed (e.g., using a bus) before distribution. That is, the left output of all panners is mixed and placed on the left channel, same for the right channel, and so on. During reproduction, each audio signal is sent to the loudspeaker corresponding to that audio signal. For example, the mixed audio signal for (L) is provided to the left-front loudspeaker, the mixed audio signal for (R) is provided to the right-front loudspeaker, and so on.

For object-based audio, instead of mixing all sounds in the studio and distributing the final mix, all of the sounds can be independently distributed and then mixed during reproduction. Thus, like for channel-based audio, panners are used during recording to position the sound, but the panning information is not applied to mix the sound at this stage. Instead, metadata is used to indicate where the sounds should be positioned. The metadata is distributed along with the audio channels and during reproduction the panning information is actually applied to the sound based on the actual local reproduction setup. The panning information for a particular object may not be static but changing in time. The panning information may indicate the position of the sound, the size of the sound (e.g., the desired spread or number of loudspeakers for the sound), or other information. Each sound and its corresponding metadata is referred to as an "object."

Although not shown in FIG. 1, multimedia system 100 may include a renderer. In some aspects, the renderer may be implemented on the input controller. In some aspect, one or more renderers may be implemented in a receiver or decoder. The receiver or decoder may also be implemented in the input controller. The renderer is the component where the audio and its associated metadata are combined to produce the signal that will feed the loudspeakers of the local reproduction setup.

Although not shown in FIG. 1, multimedia system 100 may include a decoder. In some aspects, the decoder may be implemented with the renderer. In some aspects, the decoder may be implemented on the input controller. The decoder is the component that decodes an audio signal and its associated metadata.

In the case that the local reproduction setup conforms to a known standard layout (e.g., as defined in ITU-R 775.3), the renderer may be pre-programmed with the standard layouts. The renderer is able to map the audio signals to the output loudspeaker signals. In the case that an unknown local reproduction setup is used, the renderer is provided with information about the local reproduction setup, such as (i) the number of loudspeakers and (ii) the positions (e.g., angle and/or distance) of the loudspeakers relative to a reference position.

With object-based audio, the user 105 can make choices about the configuration of the audio, which can be added to the mix, to optimize the user's experience. For example, the user 105 can select the audio type (mono, stereo, surround, binaural, etc.), adjust particular audio signals (e.g., turn up the sound for dialogue, where dialogue is provided as an independent object), omit certain audio signals (e.g., turn off commentary on a sports game, where the commentary is provided as an independent object), select certain audio signals (e.g., select a language option for dialogue, where different languages for the dialogue are provided as independent objects), or other user preferences.

As mentioned above, the sounds output by the local reproduction setup produce the sound field 150 (or sound image). In a stereophonic sound reproduction setup including a left and a right loudspeaker (e.g., loudspeakers 115 and 125) radiating sound into a listening area in front of the loudspeakers, optimal stereophonic sound reproduction can be obtained in the symmetry plane between the two loudspeakers. If substantially identical signals are provided to the two loudspeakers, a listener (e.g., user 105) sitting in front of the loudspeakers in the symmetry plane will perceive a sound image in the symmetry plane between the loudspeakers. However, if the listener for instance moves to the right relative to the symmetry plane, the distance between the listener and the right loudspeaker will decrease and the distance between the listener and the left loudspeaker will increase, resulting in that the perceived sound image will move in the direction of the right loudspeaker, even though identical signals are still applied to the two loudspeakers. Thus, generally, the perceived position of specific sound images in the total stereo image will depend on the position of the listener relative to the local loudspeaker setup. This effect is, however, not desirable as a stable stereophonic sound image is desired, i.e., a sound image in which the position in space of each specific detail of the sound image remains unchanged when the listener moves in front of the loudspeakers.

In addition, the perceived sound image may change when the user rotates relative to the loudspeakers. As mentioned above, in a multimedia system, the audio content and the visual content may be tethered or untethered to the user. Where both the audio and the visual content are untethered to the user and where both the audio and the visual content are tethered to the user, then if the user reorients themselves, there is no mismatch between the audio and visual content as the audio and visual content will both rotate along with the user (tethered scenario) or will both not rotate along with the user (untethered scenario). However, where the visual content is untethered and the audio content is tethered to the user, as well as where the visual content is tethered and the audio content is untethered to the user, then if the user reorients themselves, the visual content and the audio content are rotated relative to each other, causing a mismatch between the visual and audio content.

Figure 3:
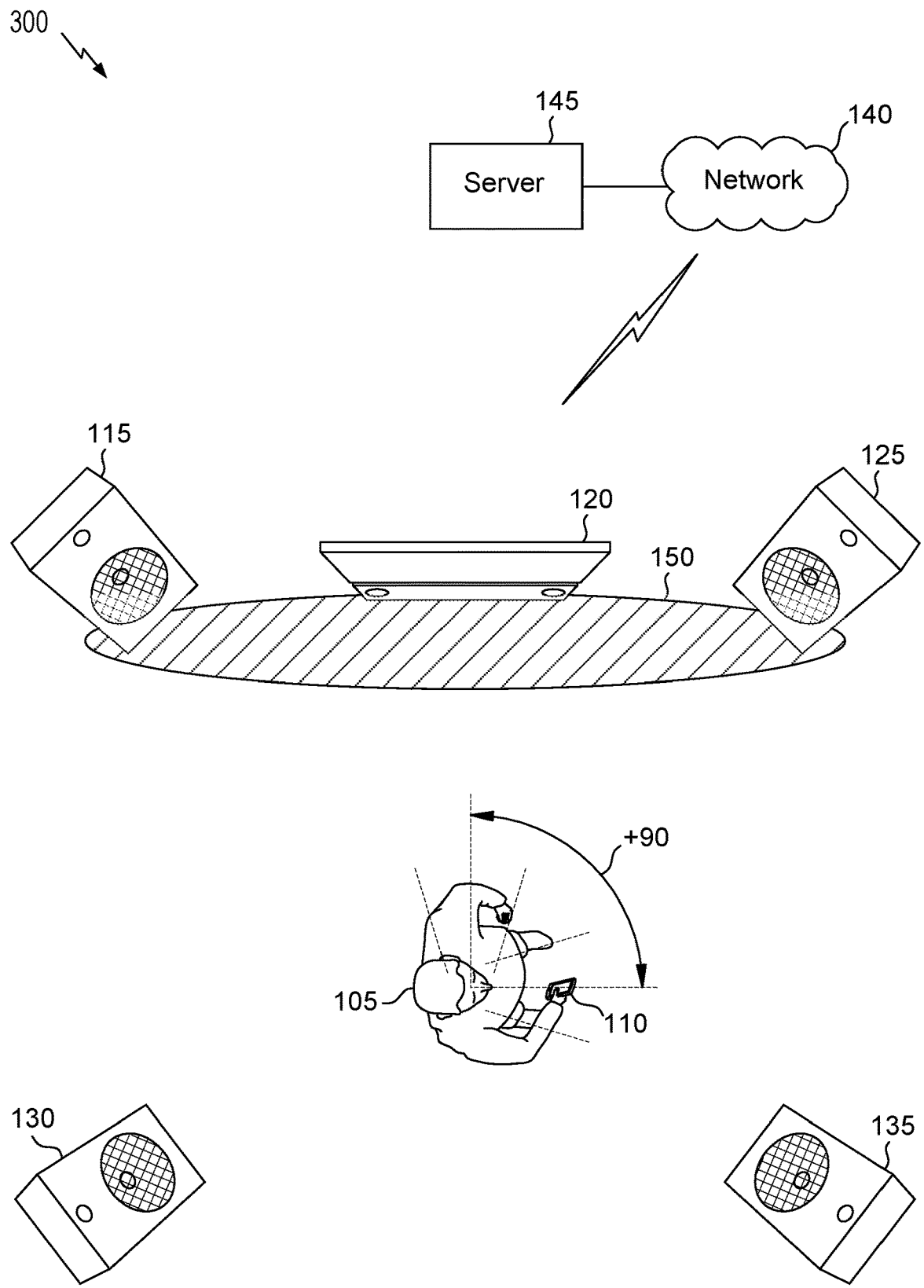
FIG. 3 depicts a block diagram of a user and tethered video display rotated relative to a sound field in a multimedia system, according to one or more aspects.

FIG. 3 illustrates a user 105 that reorients themselves within the multimedia system 100. For example, as illustrated, the user 105 may rotate by +90° relative to the center. Because in the example multimedia system 100 the loudspeakers 115, 120, 125, 130, and 135 are untethered to user 105 and the visual content is tethered to the user (e.g., tablet 110 held by the user 105), when the user 105 rotates, a +90° mismatch is created between the audio and visual content. This may be undesirable for the user experience.

In an illustrative example, the user 105 may be viewing content (e.g., a movie, video, TV show, etc.) with 5.1 surround audio using five-channel audio with the five loudspeaker 115, 120, 125, 130, and 135 of example multimedia system 100 to reproduce the audio content and tablet 110 to display the associated video content. Initially, the user 105 is oriented facing the "front" loudspeakers (e.g., loudspeakers 115, 120, and 125), i.e., with respect to the reference orientation at 0°, and, therefore, the user 105 faithfully perceives the "front" audio content. However, after the user 105 rotates +90°, as shown in FIG. 3, the user 105 is still viewing the tethered video content in "front" of user 105 (e.g., playing on the tablet 110 held by the user 105), but now the sound field 150 generated by the "front" loudspeakers is mismatched by 90° relative to the user 105 and the tethered visual content (e.g., tablet 110). In this case, now the "front" audio content is all to the "left" of the user 105 and is not aligned with the visual content the user 105 is consuming. This mismatch may provide an incoherent audio-visual experience for the user. In case of full 180° rotation (not shown in FIG. 3) of the user 105 and the tethered visual content, not only will the "front" sound now come from behind the user 105, the sound will also be left-right reversed, further degrading the user experience.

Accordingly, a mismatch between the visual orientation and audio orientation may degrade the user's experience. Consequently there is a need for a loudspeaker setup that does not suffer from this disadvantageous effect of the orientation of the listener relative to the loudspeaker setup on the perceived sound image.

Example Adaptive Sound Scene Rotation

According to aspects of the present disclosure, a user's instantaneous orientation (or the orientation of a video display tethered to a user), relative to a known reference point, may be used with (e.g., before, during, or after) a panning algorithm that redistributes audio signals over available loudspeakers within a local reproduction setup. The user's instantaneous orientation is used to adaptively rotate the sound scene to compensate for audio and video mismatch due to the user's orientation. In some aspects, the sound scene is adaptively rotated such that although the loudspeakers are untethered to the user, the sound is perceived by the user as though the audio system were tethered to the user. Accordingly, as the user rotates, the sound field rotates with the user so the user receives a consistent, stable, sound scene, providing an enhanced listening experience for the user.

Figure 4:
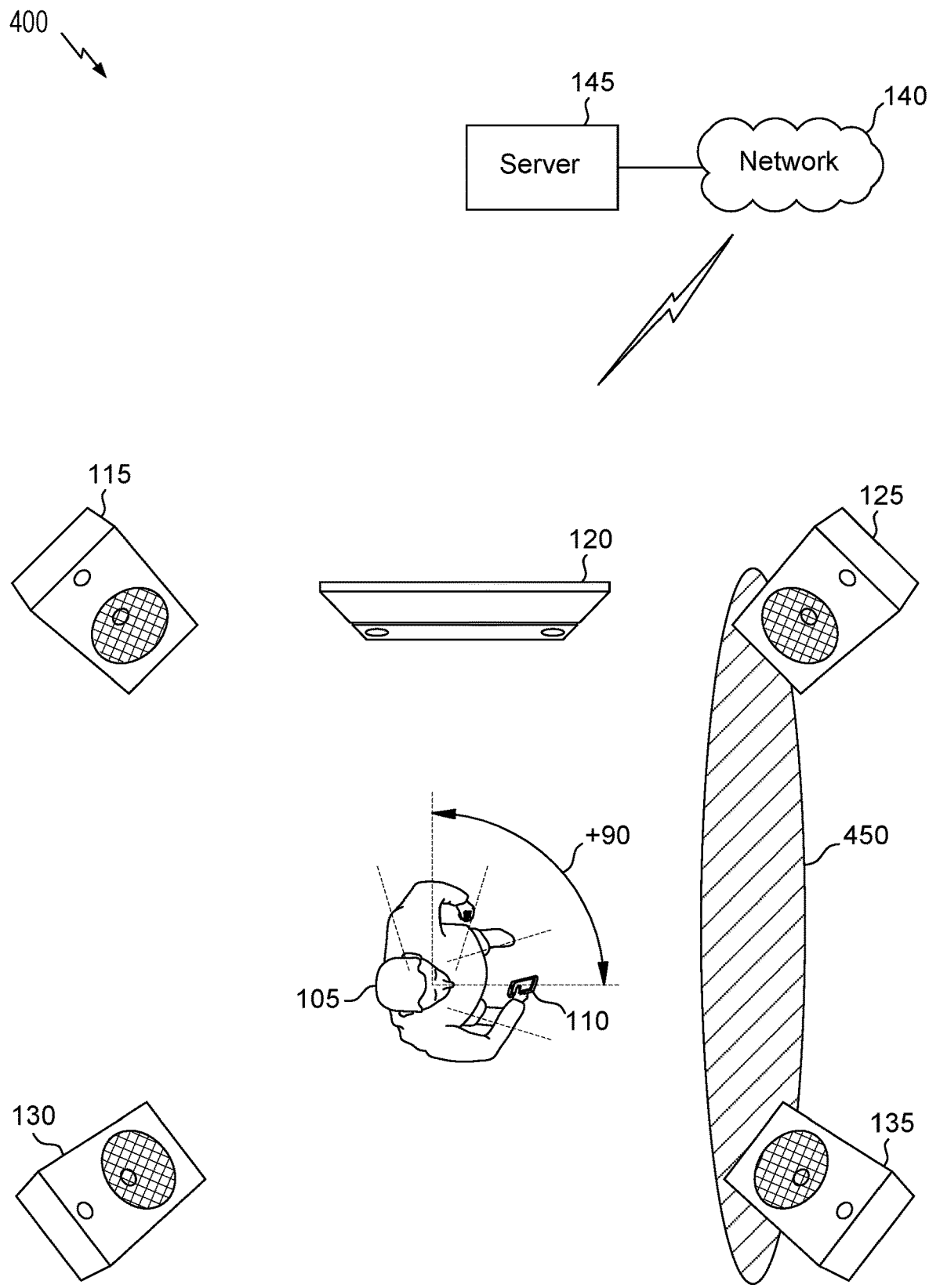
FIG. 4 depicts an example of an adaptively rotated sound field based on the user and tethered video display rotation in the multimedia system of FIG. 3, according to one or more aspects.

Referring back to the scenario illustrated in FIG. 1, a user 105 is viewing tethered video content on tablet 110 with a reference user orientation (at 0°) and the user 105 is listening to untethered audio content from the loudspeakers 115 and 125 generating sound field 150 "in front" of the user 105. FIG. 4 depicts an example of an adaptively rotated sound field based on the user rotation, according to one or more aspects. As shown in FIG. 4, when the user 105 rotates by ninety degrees (+90°) with respect to the reference user orientation (at 0°), the sound scene is adaptively rotated with the user 105, such that the loudspeakers 125 and 135 generate the rotated sound field 450. Unlike in FIG. 3, in which after the user 105 rotates by ninety degrees (+90°), with respect to the reference user orientation (at 0°), the sound field 150 is not rotated with the user 105 and is then perceived to "the left" of the user 105, with the adaptive sound scene rotation illustrated in FIG. 4, the adaptively rotated sound field 450 is "in front" of the user 105 and the user 105 perceives the sound scene correctly (e.g., with the audio and video content matched), as though the audio content were tethered to the user 105.

Figure 5:
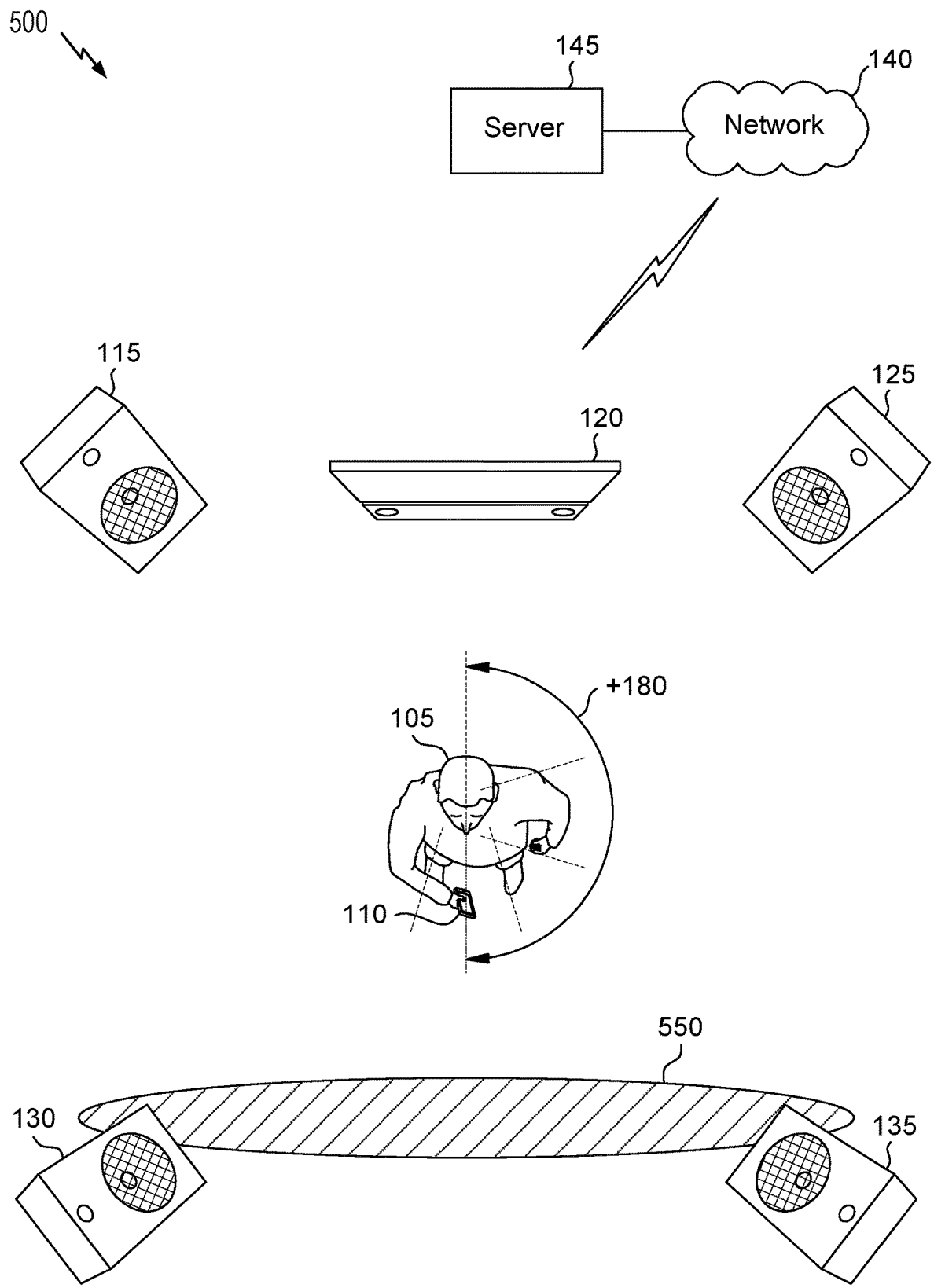
FIG. 5 depicts another example of an adaptively rotated sound field based on the user and tethered video display rotation in the multimedia system of FIG. 3, according to one or more aspects.

FIG. 5 illustrates an example in which the user 105 rotates one-hundred and eighty degrees (at 180°). As shown, the sound scene is adaptively rotated such that the loudspeakers 130 and 135 generate the rotated sound field 550. In this case, even at the full 180° user rotation, the sound field 550 is "in front" of the user 105 and the user 105 continues to perceive the sound scene correctly, as though the audio content were tethered to the user 105.

In some aspects, the use of the adaptive sound scene rotation is selected by the user 105. For example, the tethered video device (e.g., tablet 110), or another device (e.g., the control unit), may provide a user interface (UI) that provides the user 105 an option to select whether to apply the adaptive sound scene rotation. In some aspects, the adaptive sound scene rotation can be automatically applied by the system when the system detects that the user 105 is consuming untethered audio and tethered video.

Figure 6:
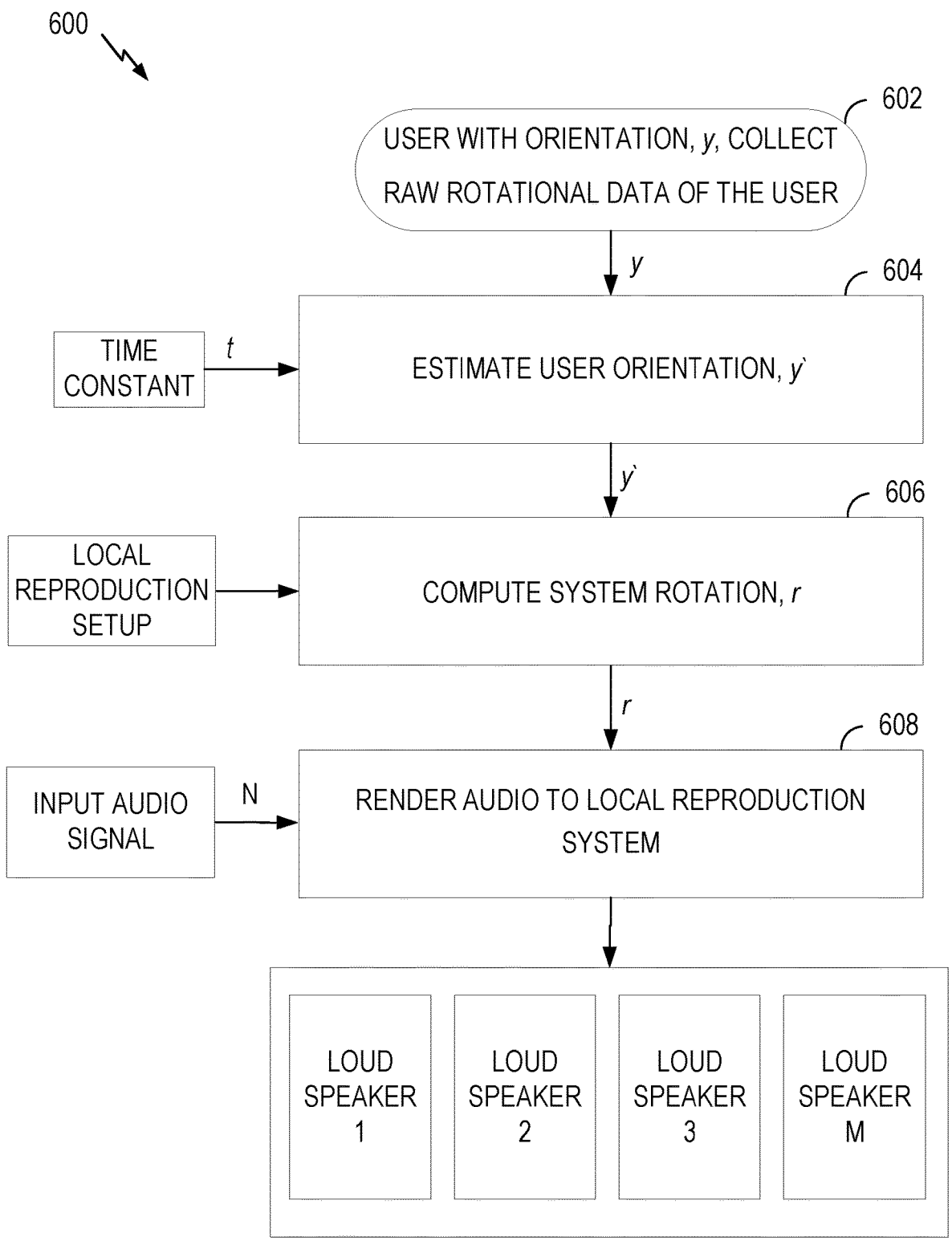
FIG. 6 depicts a block diagram of an example workflow for rendering audio to a local reproduction system with adaptive sound field rotation, according to one or more aspects.

FIG. 6 depicts a block diagram of an example workflow 600 for rendering audio to a local reproduction system with adaptive sound field rotation, according to one or more aspects.

As shown in FIG. 6, the workflow 600 may begin, at 602, by collecting raw rotation data of a user (e.g., such as the user 105 illustrated in FIGS. 1-5) with orientation y. The user's orientation may be defined with respect to a reference user orientation. The reference user orientation may be predefined, input to the system, or dynamic.

In some aspects, the detection of the user's orientation may include directly detecting the user's orientation, such as by using a head-tracking technology (e.g., digital compasses, LiDar, cameras, eye or face-tracking software, Bluetooth, ultrasound, or other positioning technologies). In some aspects, the detection of the user orientation is indirect, such as by detecting orientation of a device associated with the user (e.g., the orientation of the tethered video device).

After collecting the raw rotation data of the user, y, the workflow 600 proceeds to 604, in which the user's orientation, y', is estimated. The user's orientation may be estimated based on the raw rotation data of the user, y. In some aspects, a time constant, t, is first used to smooth the raw rotation data of the user, y. Smoothing the raw rotation data of the user, y, may filter out rotation data points of the user that occur for only a very short period of time. This helps reduce the sensitivity of the system. For example, if the user turns very quickly, but then returns to the reference user orientation, these points may be disregarded. The estimated user orientation, y', may be a value between 0° to 360° with respect to the reference user orientation.

In some aspects, the collection of the raw rotation data of the user and the processing of the raw rotation data of the user, at 602 and 604, may be performed at a single integrated device or across multiple devices. In some aspects, the device or system that collects and processes the raw rotation data of the user is implemented on another device within the system. For example, the user orientation device or system may be implemented on a loudspeaker (e.g., one or multiple of the loudspeakers 115, 120, 125, 130, and 135) within the local reproduction system (e.g., multimedia system 100) or implemented on a control unit within the system. In some aspects, the user orientation device or system may be implemented on a separate stand-alone device within the system. In some aspects, the user orientation could be estimated outside of the system, such as by a remote server (e.g., server 145) connected to the system via a network (e.g., network 140).

After estimating the user orientation, y', the workflow 600 proceeds to 606, in which the system rotation (systemRotation), r, is computed. The system rotation, r, can be computed based on the estimated user orientation, y'. In some cases, the system rotation, r, is equal to the user orientation, y'. In some cases, the computation of the system rotation, r, takes the local reproduction setup information and/or user preferences as input. As discussed above, the local reproduction setup information may include at least the number of available loudspeakers and the positions of the loudspeakers (e.g., with respect to a reference point). The local reproduction setup information and/or user preferences may be used to set upper and lower limits of the system rotation, r, (e.g., by clipping the rotation data of the user or by setting a minimum and/or a maximum to the system rotation). In an illustrative example, for a reproduction system with only two loudspeakers, located at +30° and −30° with respect to a reference point, if the user is rotated +180° (e.g., as shown in FIG. 5, but without the loudspeakers 130 and 135), rotating the sound scene by +180° without clipping would result in no sound being reproduced because the reproduction system has no loudspeakers at the rotated positions. Instead, in this scenario, the system rotation, r, may be lower bound at −30° and upper bound at +30°.

In some aspects, the system rotation is computed by processing within a device within the system. For example, the system rotation may be computed by a loudspeaker (e.g., one or multiple of the loudspeakers 115, 120, 125, 130, and 135) within the local reproduction system (e.g., multimedia system 100) or by a control unit within the system. In some aspects, the system rotation may be computed by a separate stand-alone device within the system. In some aspects, the system rotation may be computed outside of the system, such as by a remote server (e.g., server 145). The system rotation, r, may be a value between 0° to 360°. For rotations greater than 360°, the system rotation, r, may wraparound (e.g., . . . , 359°, 360°, 1°, 2°, . . . ). In some aspects, the system rotation, r, may be in units of quaternions, Euler angles, float values, integers, a combination thereof, or in other units.

After computing the system rotation, r, the workflow 600 proceeds to 608, in which the audio is rendered to the local reproduction system. The rendering is based on the system rotation. The rendering rotates the input audio signal to loudspeakers within the local reproduction system. The input audio signal may be fed to a panning algorithm that decides on which loudspeakers of the local reproduction system to place the audio signal. For example, the audio signal may be associated with N audio channels and each audio channel is associated with position information. The positional information indicates the position of the source of the audio and, thereby, the intended/target position that the audio is intended to be perceived by the user. This positional information is used to render the audio to the appropriate loudspeaker or loudspeakers within the local reproduction system to generate the desired sound field for the user.

In some aspects, the system rotation, r, is applied to the input audio signal and the rotated audio signal is fed to the panning algorithm along with the local reproduction setup information (e.g., number of available loudspeakers and positions of the loudspeakers). For example, the system rotation, r, may be applied to rotate the positional information associated with the audio channels.

In some aspects, the system rotation, r, is fed to the panning algorithm with the input audio signal and the local reproduction setup information. In this case, the panning algorithm uses the system rotation, r, in rendering the audio. For example, one or more coefficients of the panning algorithm may be rotated according to the system rotation, r.

In some aspects, the system rotation, r, is applied to the output of the panning algorithm. In this case, the audio signal and the local reproduction setup information are fed to the panning algorithm. The panning algorithm outputs the loudspeakers (or loudspeaker positions) for the audio channels. The system rotation, r, may then be applied to rotate the output of the panning algorithm before the output audio channels are rendered to the local reproduction system. In some aspects, a second panning algorithm can be used to rotate the output of the first panning algorithm.

In some aspects, the system rotation, r, is applied to the local reproduction setup information. In this case, the audio signal and the local reproduction setup information are fed to the panning algorithm and the panning algorithm outputs the loudspeakers (or loudspeaker positions) for the audio channels. The panning algorithm is then applied to the rotated positions of the local reproduction setup.

For channel-based panning (e.g., where input channels are mapped to output channels), the system rotation, r, may be applied before or after the panning algorithm, to rotate the positional information or the local reproduction setup information. For other panning algorithms (e.g., such as Ambisonics), the system rotation, r, may be applied by the panning algorithm (or before or after the panning)

In some aspects, the rendering is performed by a renderer. In some aspects, the renderer is implemented by a device within the system. For example, the renderer may be implemented at a loudspeaker (e.g., one or multiple of the loudspeakers 115, 120, 125, 130, and 135) within the local reproduction system (e.g., multimedia system 100) or at a control unit within the system. In some aspects, the renderer may be a separate stand-alone device within the system. In some aspects, the rendering could be performed outside of the system, such as by a remote server (e.g., server 145).

In some aspects, upmixing or downmixing may further be applied, either before or after the panning. For example, where there are N input audio channels and M available loudspeakers in the local reproduction system, and where M is less than N, downmixing may be performed, or where M is greater than N, upmixing may be performed. In some aspects, the upmixing or downmixing is performed by the decoder.

Figure 7:
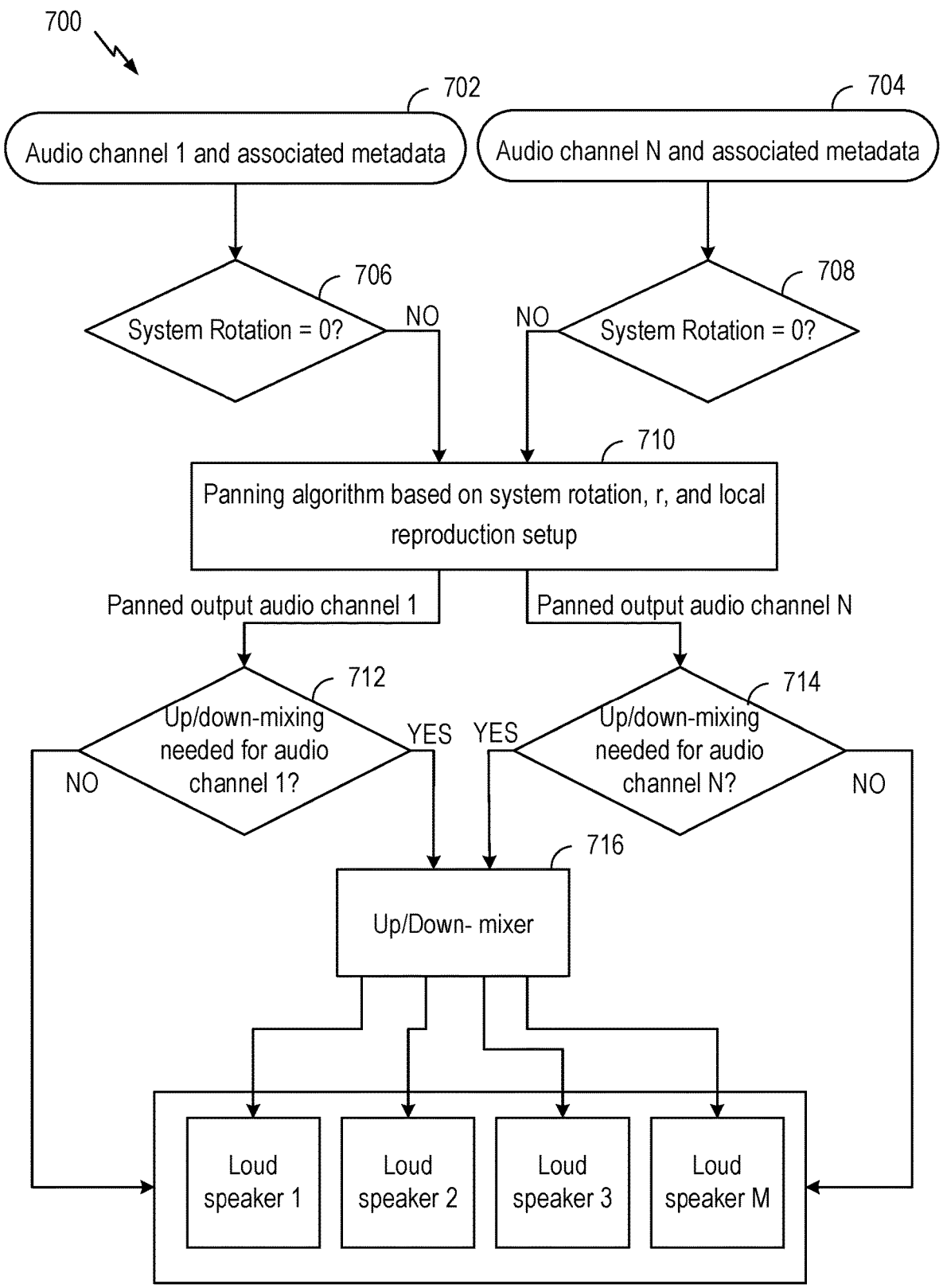
FIG. 7 depicts an example workflow for rendering audio to a local reproduction system with adaptive sound field rotation with up/down-mixing performed after panning, according to one or more aspects.

FIG. 7 depicts an example workflow 700 for adaptively rendering audio to a local reproduction system with upmixing or downmixing performed after panning. As shown in FIG. 7, N input audio channels may be received. For simplicity, the workflow 700 is shown for the audio channel 1 and the audio channel N. It should be understood that the workflow 700 is applicable to each of the N audio channels. Further, the workflow 700 is shown for the case of M available loudspeakers, and the workflow 700 is shown for the loudspeaker 1, loudspeaker 2, loudspeaker 3, and loudspeaker M. It should be understood that the workflow 700 is applicable to each of the M loudspeakers.

As shown in FIG. 7, the audio channel 1 and its associated metadata (which may be carried separately or encoded in the audio channel) is obtained, at 702, and the audio channel N and its associated metadata (which may be carried separately or encoded in the audio channel), at 704. For example, the audio channels 1 . . . N may be received at a decoder. The decoder may provide the audio channels to a renderer.

At 706, the system checks whether there is a system rotation to be applied to audio channel 1, for example, whether system rotation=0. At 708, the system checks whether there is a system rotation to be applied to audio channel N, for example, whether system rotation=0. Although the checks at 706 and 708 are shown as separate, independent, checks for the audio channels 1 . . . N, there could be a single check of whether system rotation is to be applied to the audio channels 1 . . . N. For example, where the system rotation is applied equally to rotate of all of the input signals, then a single check can be performed. In some cases, however, the system rotation can be performed in a channel-specific manner. For example, for a 5.1 surround audio input, the system rotation may be applied only for the "front" channels (e.g., left, right, and center) and not for the surround channels, as the "front" channels typically contain the important dialogue. As another example, for object-based input audio, the system rotation may be applied for certain objects (e.g., in a new broadcast, the important dialogue may be transmitted as one object and the object may be rotated based on the system rotation) and not for other objects (e.g., optional background sounds of the new broadcast).

If the system determines, at 706 or 708, that there is no system rotation (i.e., system rotation=0 is YES), then the audio channel may be panned with no rotation applied (not shown). If the system determines, at 706 or 708, that there is system rotation (i.e., system rotation=0 is NO), then the audio channel may be panned, at 710, with the system rotation applied. As discussed above, the system rotation may be applied to rotate the positional information associated with the audio channel before the audio channel is panned at 710, the system rotation may be applied during the panning at 710 (e.g., by rotation of one or more coefficients of the panning algorithm), the system rotation may be applied after the panning at 710 to rotate the output of the panning algorithm, or the system rotation may be applied to rotate the local reproduction setup information (e.g., to rotate either the reference point or the loudspeaker positions within the local reproduction system). In some aspects, a second panning algorithm is used (not shown) to apply the system rotation to the output or the input of the first panning algorithm.

After the panning, at 710, the system checks whether upmixing or downmixing is to be performed for the panned output audio channel 1, at 712, and whether upmixing or downmixing is to be performed for the panned output audio channel N, at 714. Although the checks at 712 and 714 are shown as separate, independent, checks for the audio channels 1 . . . N, there could be a single check of whether upmixing or downmixing is to be applied to the audio channels 1 . . . N. For example, where the upmixing or downmixing is applied equally to all of the input signals, then a single check can be performed. However, in some cases, upmixing or downmixing can be performed in a channel-specific manner.

If the system determines, at 712 or 714, that there is no upmixing or downmixing to be performed (i.e., upmixing or downmixing needed is NO), then the audio channel may be rendered to the corresponding loudspeaker in the local reproduction system in accordance with the panning. If the system determines, at 712 or 714, that there is upmixing or downmixing to be performed (i.e., upmixing or downmixing needed is YES), then the audio channel may be upmixed or downmixed accordingly at 716. After the upmixing or downmixing, at 716, the mixed audio channels may then be rendered to the corresponding loudspeaker in the local reproduction system in accordance with the panning.

Figure 8:
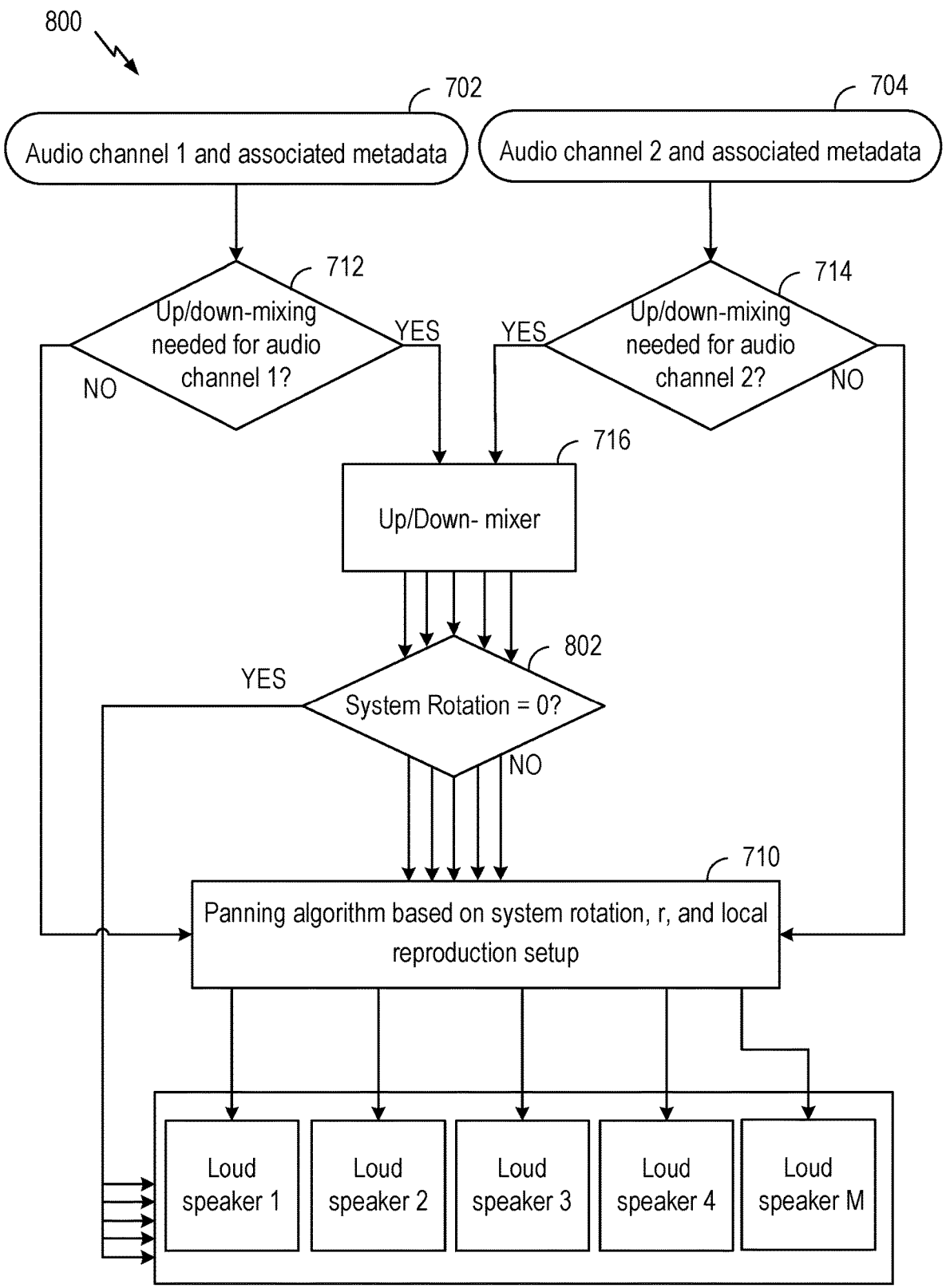
FIG. 8 depicts an example workflow for rendering audio to a local reproduction system with adaptive sound field rotation with up/down-mixing performed before panning, according to one or more aspects.

While FIG. 7 illustrates an example workflow 700 in which mixing of the audio channels is done after the panning and after applying the system rotation, in some aspects, the mixing of the audio channels, at 716, is done before the panning, at 710 and before applying the system rotation, at 802 as shown in FIG. 8. FIG. 8 also illustrates an example of upmixing two audio channels, at 716, to five audio channels (e.g., in a case where two-channel stereo audio input is received and the local reproduction system has five available loudspeakers, the input may be upmixed to 5.1 audio). FIG. 8 also illustrates an example where the system rotation check, at 802, is performed as a single check for the audio channels.

The aspects described herein provide a technical solution to a technical problem associated with audio and video mismatch due to rotation of a user consuming video content from a tethered video device and audio content from untethered audio devices. More specifically, implementing the aspects herein allows for adaptive sound scene rotation such that the untethered audio is perceived as though tethered to the user as the user rotates.

Example Method for Adaptive Sound Scene Rotation

Figure 9:
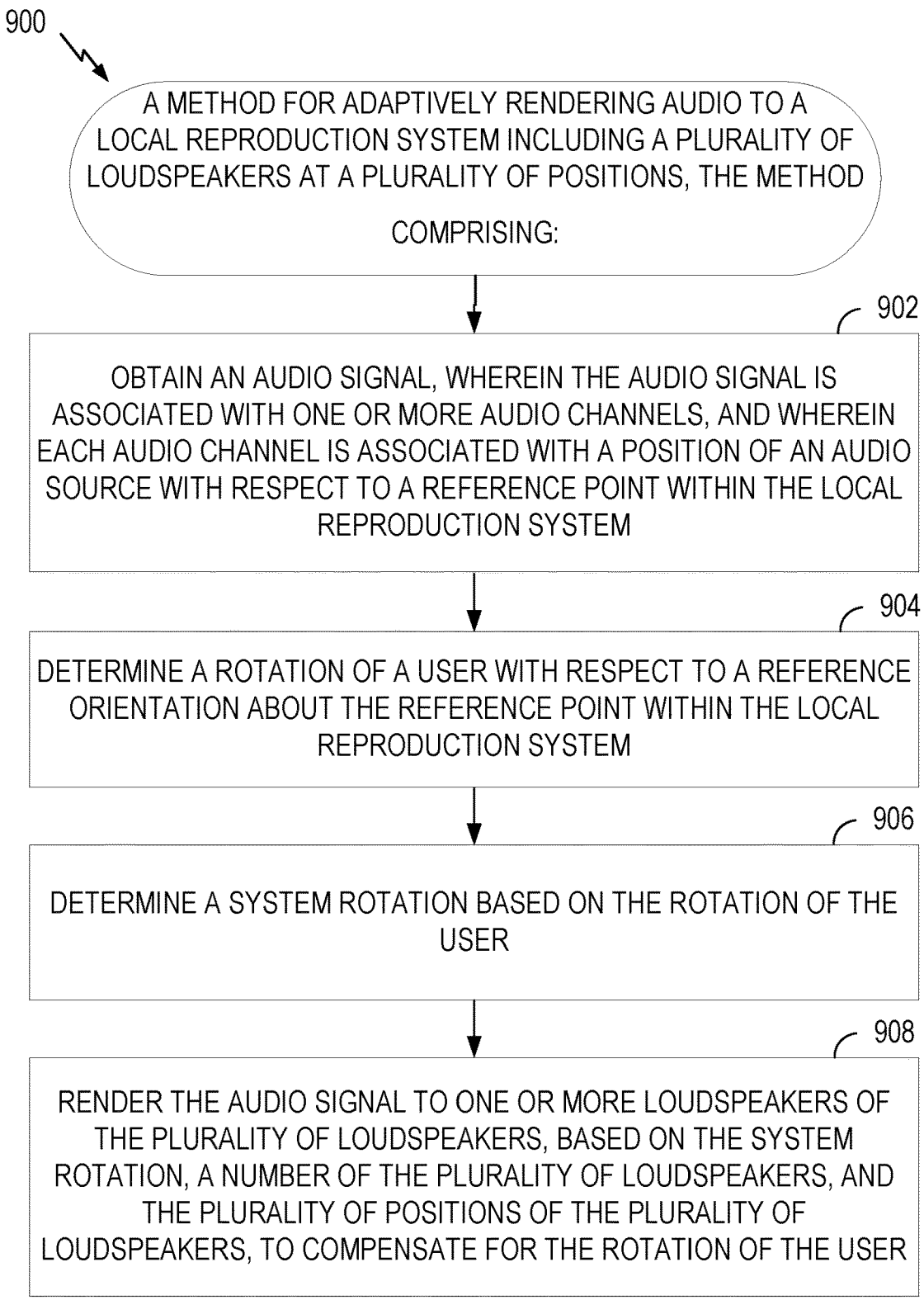
FIG. 9 depicts a flow diagram illustrating example operations for adaptively rendering audio to a local reproduction system with adaptive sound field rotation, according to one or more aspects.

FIG. 9 depicts an example workflow with operations 900 for adaptively rendering audio to a local reproduction system (e.g., such as multimedia system 100 illustrated in the FIG. 1) including a plurality of loudspeakers (e.g., such as loudspeakers 115, 120, 125, 130, and 135 illustrated in FIG. 1) at a plurality of positions, according to one or more aspects. The operations 900 may be understood with reference to the FIGS. 1-8.

Operations 900 may begin, at operation 902, with obtaining an audio signal. The audio signal is associated with one or more audio channels. Each audio channel is associated with a position (e.g., an intended or target position) of an audio source with respect to a reference point within the local reproduction system.

Operations 900 include, at operation 904, determining a rotation (e.g., y') of a user (e.g., user 105) with respect to a reference orientation about the reference point within the local reproduction system. In some aspects, determining the rotation of the user, at operation 904, includes collecting raw rotational data (e.g., y) of the user; applying a time constant (e.g., t) to smooth the raw rotational data; and estimating the rotation of the user based on the smoothed rotational data. In some aspects, operations 900 further include determining rotation of a video display (e.g., tablet 110) tethered to the user, where the plurality of loudspeakers are untethered to the user and the video display.

Operations 900 include, at operation 906, determining a system rotation (e.g., r) based on the rotation of the user. In some aspects, determining the system rotation, at operation 906, includes clipping the determined rotation of the user based on the number of the plurality of loudspeakers and the plurality of positions of the plurality of loudspeakers. In some aspects, determining the system rotation, at operation 906, is performed at a loudspeaker of the plurality of loudspeakers, a control unit associated with the local reproduction system, or a server (e.g., server 145) connected to the local reproduction system via a network (e.g., network 140).

Operations 900 include, at operation 908, rendering the audio signal to one or more loudspeakers of the plurality of loudspeakers, based on the system rotation, a number of the plurality of loudspeakers (e.g., M available loudspeakers), and the plurality of positions of the plurality of loudspeakers, to compensate for the rotation of the user.

In some aspects, rendering the audio signal, at operation 908, to compensate for the rotation of the user includes rendering audio channels to the one or more loudspeakers of the plurality of loudspeakers to generate a sound image such that, in the generated sound image, positions of the audio sources with respect to the user match the positions of the audio sources with respect to the reference point in the obtained audio signal.

In some aspects, rendering the audio signal, at operation 908, includes inputting the system rotation, the audio channels, the number of the plurality of loudspeakers, and the plurality of positions of the plurality of loudspeakers to a panning algorithm; rotating one or more coefficients of the panning algorithm based on the system rotation; and rendering the audio signal to the local reproduction system according to the output of the panning algorithm.

In some aspects, rendering the audio signal, at operation 908, includes applying the system rotation to each of the audio channels of the obtained audio signal to rotate the associated position of the audio source with respect to the reference point; after applying the system rotation, inputting the audio channels, the number of the plurality of loudspeakers, and the plurality of positions of the plurality of loudspeakers to a panning algorithm; and rendering the audio signal to the local reproduction system according to the output of the panning algorithm.

In some aspects, rendering the audio signal, at operation 908, includes inputting the audio channels, the number of the plurality of loudspeakers, and the plurality of positions of the plurality of loudspeakers to a first panning algorithm; inputting the system rotation, the number of the plurality of loudspeakers, the plurality of positions of the plurality of loudspeakers, and output of the first panning algorithm to a second panning algorithm; and rendering the audio signal to the local reproduction system according to the output of the second panning algorithm.

In some aspects, operations 900 further include, after determining the system rotation and before panning the audio signal, up-mixing the audio signal or down-mixing the audio signal.

In some aspects, operations 900 further include, after determining the system rotation and after panning the audio signal, up-mixing the audio signal or down-mixing the audio signal.

Example Adaptive Sound Scene Rotation Device

Figure 10:
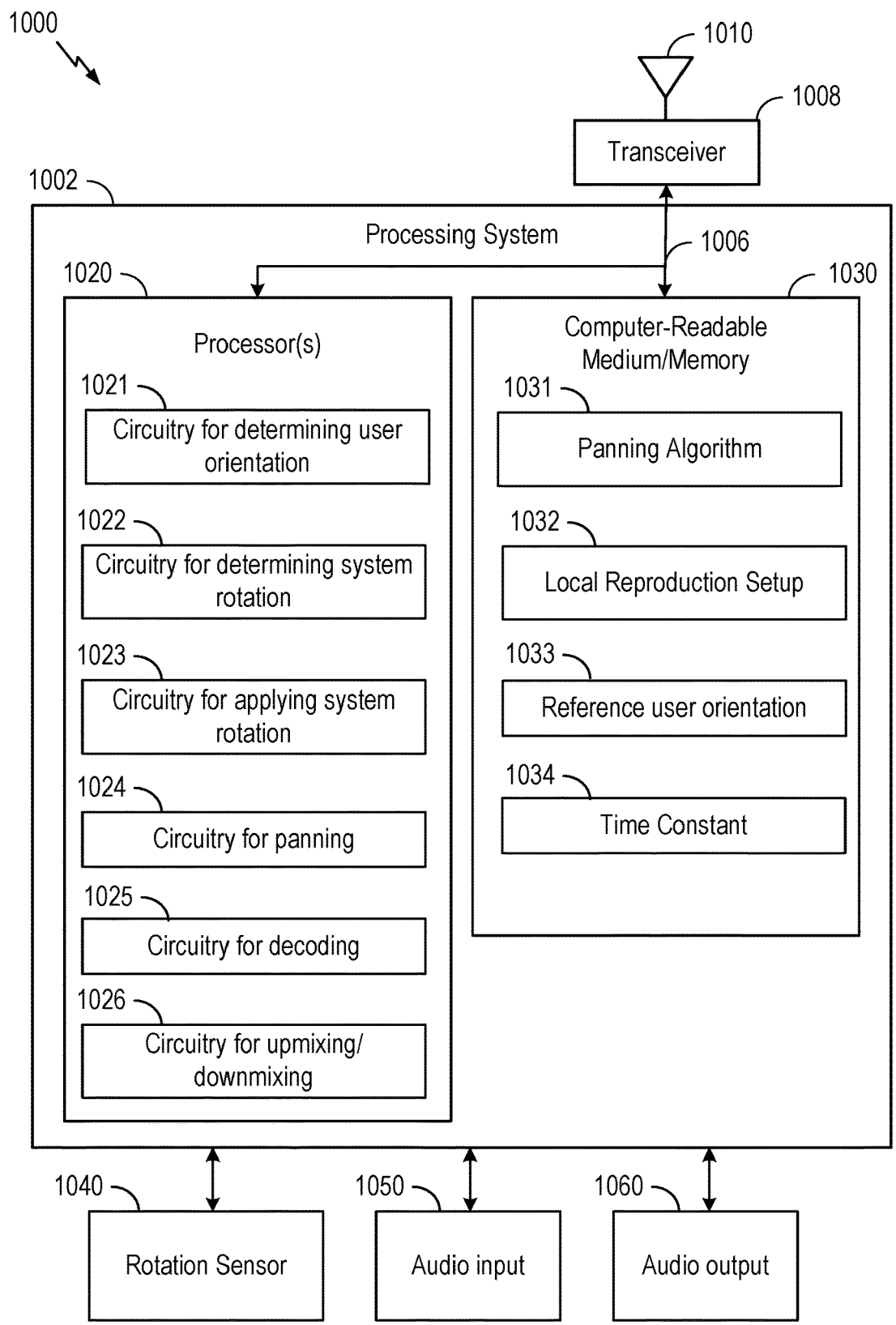
FIG. 10 depicts an example apparatus for rendering audio to a local reproduction system with adaptive sound field rotation, according to one or more aspects.

FIG. 10 depicts aspects of an example device 1000. In some aspects, device 1000 is an input controller. In some aspects, device 1000 is a loudspeaker, such as one of the loudspeakers 115, 120, 125, 130, and 135 described above with respect to FIG. 1. While shown as a single device 1000, in some aspects, components of device 1000 may be implemented across multiple physical devices with in a multimedia system, such as multimedia system 100 described above with respect to FIG. 1, and/or within a network, such as by server 145 within network 140.

The device 1000 includes a processing system 1002 coupled to a transceiver 1008 (e.g., a transmitter and/or a receiver). The transceiver 1008 is configured to transmit and receive signals for the device 1000 via an antenna 1010, such as the various signals as described herein. The processing system 1002 may be configured to perform processing functions for the device 1000, including processing signals received and/or to be transmitted by the device 1000.

The processing system 1002 includes one or more processors 1020. The one or more processors 1020 are coupled to a computer-readable medium/memory 1030 via a bus 1006. In certain aspects, the computer-readable medium/memory 1030 is configured to store instructions (e.g., computer-executable code) that when executed by the one or more processors 1020, cause the one or more processors 1020 to perform the operations 900 described with respect to FIG. 9, or any aspect related to it. Note that reference to a processor performing a function of device 1000 may include one or more processors performing that function of device 1000.

The one or more processors 1020 include circuitry configured to implement (e.g., execute) the aspects described herein for adaptive sound scene rotation, including circuitry for determining a user orientation 1021, circuitry for determining a system rotation 1022, circuitry for applying a system rotation 1023, circuitry for panning 1024, circuitry for decoding 1025, and circuitry for upmixing/downmixing 1026. Processing with circuitry 1021-1026 may cause the device 1000 to perform the operations 900 described with respect to FIG. 9, or any aspect related to it.

In the depicted example, computer-readable medium/memory 1030 stores code (e.g., executable instructions). Processing of the code may cause the device 1000 to perform the operations 900 described with respect to FIG. 9, or any aspect related to it. In addition, computer-readable medium/memory 1030 may store information that can be used by the processors 1020. For example, computer-readable medium/memory 1030 may store a panning algorithm 1031, local reproduction setup information 1032, a reference user orientation 1033, and a time constant 1034.

In addition, the device 1000 may include a rotation sensor 1040 configured to collect raw rotation data provided to the circuitry for determining user orientation 1021. The device 1000 may also include a wired audio input 1050 and a wired audio output 1060, for obtaining and outputting audio signals.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f)

unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

We claim:

1. A method of adaptively rendering audio to a local reproduction system including a plurality of loudspeakers at a plurality of positions, the method comprising:
    obtaining an audio signal, wherein the audio signal is associated with one or more audio channels, and wherein each audio channel is associated with a position of an audio source with respect to a reference point within the local reproduction system;
    determining a rotation of a user with respect to a reference orientation about the reference point within the local reproduction system;
    determining a system rotation based on the rotation of the user, wherein determining the system rotation is performed at a loudspeaker of the plurality of loudspeakers, a control unit associated with the local reproduction system, or a server connected to the local reproduction system via a network; and
    rendering the audio signal to one or more loudspeakers of the plurality of loudspeakers, based on the system rotation, a number of the plurality of loudspeakers, and the plurality of positions of the plurality of loudspeakers, to compensate for the rotation of the user.

2. The method of claim 1, wherein rendering the audio signal to compensate for the rotation of the user comprises rendering audio channels to the one or more loudspeakers of the plurality of loudspeakers to generate a sound image such that, in the generated sound image, positions of the audio sources with respect to the user match the positions of the audio sources with respect to the reference point in the obtained audio signal.

3. The method of claim 1, further comprising determining rotation of a video display tethered to the user, and wherein the plurality of loudspeakers are untethered to the user and the video display.

4. The method of claim 1, wherein determining the rotation of the user comprises:
    collecting raw rotational data of the user;
    applying a time constant to smooth the raw rotational data; and
    estimating the rotation of the user based on the smoothed rotational data.

5. The method of claim 1, wherein determining the system rotation comprises:
    clipping the determined rotation of the user based on the number of the plurality of loudspeakers and the plurality of positions of the plurality of loudspeakers.

6. The method of claim 1, wherein rendering the audio signal comprises:
    inputting the system rotation, the audio channels, the number of the plurality of loudspeakers, and the plurality of positions of the plurality of loudspeakers to a panning algorithm;
    rotating one or more coefficients of the panning algorithm based on the system rotation; and
    rendering the audio signal to the local reproduction system according to the output of the panning algorithm.

7. The method of claim 1, wherein rendering the audio signal comprises:
    applying the system rotation to each of the audio channels of the obtained audio signal to rotate the associated position of the audio source with respect to the reference point;
    after applying the system rotation, inputting the audio channels, the number of the plurality of loudspeakers, and the plurality of positions of the plurality of loudspeakers to a panning algorithm; and
    rendering the audio signal to the local reproduction system according to the output of the panning algorithm.

8. The method of claim 1, wherein rendering the audio signal comprises:
    inputting the audio channels, the number of the plurality of loudspeakers, and the plurality of positions of the plurality of loudspeakers to a first panning algorithm;
    inputting the system rotation, the number of the plurality of loudspeakers, the plurality of positions of the plurality of loudspeakers, and output of the first panning algorithm to a second panning algorithm; and
    rendering the audio signal to the local reproduction system according to the output of the second panning algorithm.

9. The method of claim 1, further comprising:
    after determining the system rotation and before panning the audio signal, up-mixing the audio signal or down-mixing the audio signal.

10. The method of claim 1, further comprising:
    after determining the system rotation and after panning the audio signal, up-mixing the audio signal or down-mixing the audio signal.

11. A system of adaptively rendering audio to a local reproduction system, the system comprising:
    a plurality of loudspeakers at a plurality of positions within the local reproduction system; and
    a processing system configured to:
        obtain an audio signal, wherein the audio signal is associated with one or more audio channels, and wherein each audio channel is associated with a position of an audio source with respect to a reference point within the local reproduction system;
        determine a rotation of a user with respect to a reference orientation about the reference point within the local reproduction system;
        determine a system rotation based on the rotation of the user, wherein determining the system rotation is performed at a loudspeaker of the plurality of loudspeakers, a control unit associated with the local reproduction system, or a server connected to the local reproduction system via a network; and
        render the audio signal to one or more loudspeakers of the plurality of loudspeakers, based on the system rotation, a number of the plurality of loudspeakers, and the plurality of positions of the plurality of loudspeakers, to compensate for the rotation of the user.

12. The system of claim 11, wherein the processing system being configured to render the audio signal to compensate for the rotation of the user comprises the processing system being configured to render audio channels to the one or more loudspeakers of the plurality of loudspeakers to generate a sound image such that, in the generated sound image, positions of the audio sources with respect to the user match the positions of the audio sources with respect to the reference point in the obtained audio signal.

13. The system of claim 11, wherein the processing system is further configured to determine rotation of a video display tethered to the user, and wherein the plurality of loudspeakers are untethered to the user and the video display.

14. The system of claim 11, wherein the processing system being configured to determine the rotation of the user comprises the processing system being configured to:
collect raw rotational data of the user;
apply a time constant to smooth the raw rotational data; and
estimate the rotation of the user based on the smoothed rotational data.

15. The system of claim 11, wherein the processing system being configured to determine the system rotation comprises the processing system being configured to:
clip the determined rotation of the user based on the number of the plurality of loudspeakers and the plurality of plurality of positions of the plurality of loudspeakers.

16. The system of claim 11, wherein the processing system being configured to render the audio signal comprises the processing system being configured to:
input the system rotation, the audio channels, the number of the plurality of loudspeakers, and the plurality of positions of the plurality of loudspeakers to a panning algorithm;
rotate one or more coefficients of the panning algorithm based on the system rotation; and
render the audio signal to the local reproduction system according to the output of the panning algorithm.

17. The system of claim 11, wherein the processing system being configured to render the audio signal comprises the processing system being configured to:
apply the system rotation to each of the audio channels of the obtained audio signal to rotate the associated position of the audio source with respect to the reference point;
after applying the system rotation, input the audio channels, the number of the plurality of loudspeakers, and the plurality of positions of the plurality of loudspeakers to a panning algorithm; and
render the audio signal to the local reproduction system according to the output of the panning algorithm.

18. The system of claim 11, wherein the processing system being configured to render the audio signal comprises the processing system being configured to:
input the audio channels, the number of the plurality of loudspeakers, and the plurality of positions of the plurality of loudspeakers to a first panning algorithm;
input the system rotation, the number of the plurality of loudspeakers, the plurality of positions of the plurality of loudspeakers, and the output of the first panning algorithm to a second panning algorithm; and
render the audio signal to the local reproduction system according to the output of the second panning algorithm.

19. A loudspeaker, comprising:
a receiver configured to obtain an audio signal from a user device, wherein the audio signal is associated with one or more audio channels, and wherein each audio channel is associated with a position of an audio source with respect to a reference point within a local reproduction system, the local reproduction system including a plurality of loudspeakers including the loudspeaker;
a decoder configured to decode the audio signal;
system rotation circuitry configured to:
determine a rotation of a user with respect to a reference orientation about the reference point within the local reproduction system; and
determine a system rotation based on the rotation of the user, wherein determining the system rotation comprises determining the system rotation at the loudspeaker, determining the system rotation from a control unit associated with the local reproduction system, or determining the system rotation from a server connected to the local reproduction system via a network;
a renderer configured to render the audio signal to one or more loudspeakers of the plurality of loudspeakers within the local reproduction system, based on the system rotation, a number of the plurality of loudspeakers, and the plurality of positions of the plurality of loudspeakers, to compensate for the rotation of the user; and
a transmitter configured to provide the rendered audio signal to the one or more loudspeakers.

* * * * *